United States Patent [19]

Beling

[11] Patent Number: 4,606,231
[45] Date of Patent: Aug. 19, 1986

[54] STRAIN GAUGE MEASURING SYSTEM

[75] Inventor: Thomas E. Beling, Saxonville, Mass.

[73] Assignee: Sigma Instruments, Inc., Braintree, Mass.

[21] Appl. No.: 708,730

[22] Filed: Mar. 6, 1985

[51] Int. Cl.[4] .............................................. G01D 3/04
[52] U.S. Cl. .................................... 73/862.63; 73/766
[58] Field of Search .......... 73/862.63, 862.67, 862.64, 73/763, 765, 766, 767, 708; 374/178; 324/105

[56] References Cited

U.S. PATENT DOCUMENTS

| | | | |
|---|---|---|---|
| 2,377,869 | 6/1945 | Elliott | 73/862.64 |
| 3,582,690 | 6/1971 | Yerman | 73/765 |
| 3,836,796 | 9/1974 | Solomon et al. | 73/766 |
| 4,071,813 | 1/1978 | Dobkin | 374/178 |
| 4,459,856 | 7/1984 | Ko et al. | 73/708 |

FOREIGN PATENT DOCUMENTS 778440  7/1957  United Kingdom ............. 73/862.64

Primary Examiner—Anthony V. Ciarlante
Attorney, Agent, or Firm—Toren, McGeady, Stanger, Goldberg & Kiel

[57] ABSTRACT

In the disclosed measuring system, the strain in opposingly stressed strain gauges is measured by alternately driving currents through the gauges, and measuring the resulting differences in the alternate currents. Two reversely poled transistors, or two FETs, form low impedance switches that alternately drive the currents through the gauges. A constant current source or a resistor provides a current path to both gauges.

24 Claims, 7 Drawing Figures

STRAIN GAUGE MEASURING SYSTEM

BACKGROUND OF THE INVENTION

This invention relates to measuring systems, and particularly to measuring systems using strain gauges to determine the stress or strain placed upon a member.

Strain gauges are made of materials whose resistances vary in response to deformation of its shape, by tension, compression, or torsion. However, the resistances change only slightly in response to substantial deformation. In fact, the resistance of a material can be expected to change only 0.1% as it is stressed without the gauge material being permanently deformed. Therefore, it has been the practice to connect two pairs of gauges whose resistances change in opposite directions in response to the same strain, into a bridge and to sense the differences in the changes in resistance in response to the strain. However, the simultaneous use of four strain gauges with interdependent resistance relationships results in a complex expensive and often unreliable mechanical arrangement.

Replacing two of the gauges in the bridge with constant resistors relieves the problem of mechanical complexity. However, because the gauges and the resistors respond differently to changes in temperature, the resulting output is highly temperature sensitive. This is particularly so if the 0.1% resistance change throughout the elastic limit of the gauge material must be divided into 1000 units or more. In that case, a temperature induced change of $10^{-6}$ of the total gauge resistance produces a change of one unit. A minor difference in the temperature coefficient of resistance between the resistors and the gauges can effect a subtantial variation in the bridge output. Moreover, this alteration shifts the point at which a zero strain is measured. Effectively, the resistors must exhibit a stringent precision of 1 to 2 parts per million per degree centigrade.

SUMMARY OF THE INVENTION

An object of the invention is to improve strain gauge measuring systems.

Another object of the invention is to avoid the aforementioned disadvantages of prior measuring systems.

Another more particular object of the invention is to avoid temperature induced changes in the zero position of strain gauge measurings.

According to a feature of the invention, these and other objects of the invention are attained, in whole or in part, by mechanically arranging a pair of gauges having predetermined resistances to achieve opposite resistance effects in response to a strain, and by alternately driving current through the gauges so that the alternate currents can be compared with each other.

According to another feature of the invention, the alternate currents are driven through the gauges with a pair of switches, each in series with one of the gauges and having resistances, when on, three or more orders of magnitude lower than the resistances of the gauges.

According to another feature of the invention, the switches are transistors with emitters and collectors reversed relative to the major current flows. For example, an NPN transistor has its emitter connected toward the positive pole of the source.

According to another feature of the invention, the switches are in the form of field effect transistors.

According to yet another feature of the invention, the current is driven through a resistor connected with each of the gauges and in series with each of the gauges.

According to yet another feature of the invention, the current is driven through each of the gauges by connecting both of them to a constant current source.

These and other features of the invention are pointed out in the claims. Other objects and advantages of the invention will become evident from the following detailed description when read in light of the accompanying drawings.

DETAILED DESCRIPTION OF PREFERRED EMBODIMENTS

Figure 1:
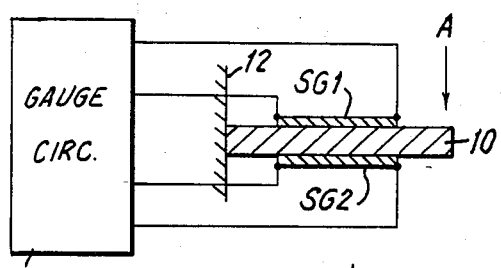
FIG. 1 is an elevation of a strain gauge measuring system showing strain gauges connected to a member which is being deformed, and altogether embodying features of the invention.

In FIG. 1, a beam 10 mounted on a wall 12 is deflected by an arrow identified as A and carries two strain gauges SG1 and SG2. A gauge circuit 14 is connected to the ends of the strain gauges SG1 and SG2 for measuring their resistances under various conditions.

When the beam 10 is deflected downwardly in the direction A, a tensile strain is applied to the gauge SG1 and a compressive strain applied to gauge SG2. Therefore, the resistances of the two gauges will vary in opposite directions. The resulting effects are measured and displayed by the gauge circuit 14 as an indication of the degree of deflection, and the force, in the direction A.

Figure 2:
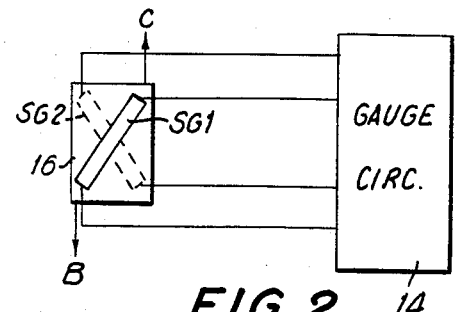
FIG. 2 is a partially schematic elevation of another arrangement embodying features of the invention and including a member carrying strain gauges and being deformed.

In FIG. 2, a member 16 is deflected by forces in the directions B and C at substantially opposite corners of the member 16. A strain gauge SG1 mounted on one face of the member 16 is subjected to tensile stress and strain in response to forces along the directions B and C. The strain gauge SG2 mounted on the other face of the member 16 and oriented angularly in a direction across the angular direction of the gauge SG1, that is in the direction of the corners to which the forces are not applied, is subject to compressive stress and strain when forces are applied along the directions B and C at their respective corners. Therefore, resistance changes occur in the gauges SG1 and SG2 in opposite direction in response to forces along the directions B and C. The gauge circuit 14 again measures and displays the resistance changes in the gauges SG1 and SG2 as an indication of the forces B and C or the deformation of the member 16. The gauges SG1 and SG2 are substantially identical and exhibit resistances of 1K each.

Figure 3:
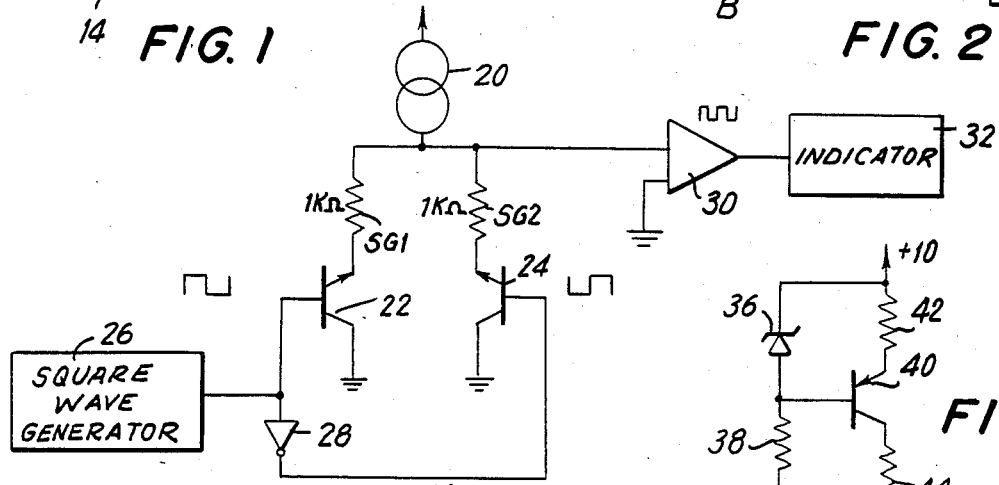
FIG. 3 is a circuit diagram of the gauge circuitry in FIGS. 1 and 2 and embodying features of the invention.

FIG. 3 illustrates details of an embodiment of the gauge circuit 14 in FIGS. 1 and 2. Here, a constant current source 20 is connected to drive current through the gauges SG1 and SG2 by way of switches in the form of NPN transistors 22 and 24. The transistors 22 and 24 are reverse poled. That is, their emitters are directed toward the positive terminal and the collectors are gounded. This contrasts with the normal connection of an NPN transistor where the collector is connected toward the positive terminal in the emitters toward the negative terminal. From the point of view of direction and current flow, the transistors in the configuration shown operate the same way as normally configured transistors. That is, a positive voltage at the base of either transistor turns the transistor on. However, when the transistors shown are turned on, i.e., saturated, the resistances between the emitters and collectors, and hence the voltages across the emitters and collectors, are substantially lower than transistors in an ordinary configuration. For example, the emitter collector voltage $V_{EC}$, when the transistor is on, is 2 or 3 mV in the configuration shown as compared to 200 mV in the ordinary configuration. This is a reduction of two orders of magnitude. The transistors 22 and 24 thus represent an extremely low resistance to current flow. This effect arises from the fact that a normally configured transistor exhibits a B of approximately 100 to 200, while the reverse poled transistors 22 and 24 exhibit B's of $\frac{1}{2}$ to 2.

In operation, the square wave generator 26 and inverter 28 first apply an on voltage to the transistor 22. This causes the constant voltage source to drive a current through the gauge SG1. On the alternate half cycle, the square wave generator 26 and inverter 28 turn off the transistor 22 and turn on the transistor 24. The constant current source 20 then drives a constant current through the gauge SG2 and transsistor 24 to ground. The current driven through the gauges SG1 and SG2 are made equal by the constant current generator. The transistors 22 and 24 exhibit minute resistances as compared to the gauges SG1 and SG2. Therefore, an amplifier 30 effectively measures the voltages alternately appearing across the gauges SG1 and SG2. Because the current is constant through these gauges, the amplifier 30 also alternately measures, in effect, the resistances of the gauges SG1 and SG2. If the resistances are equal, the resulting output will be a constant voltage or zero which is displayed by an indicator 32. The resistance of the gauge SG1 is increased and the resistance of the gauge SG2 is decreased as a result of forces applied to the beam 10 or member 16, the resulting output is a square wave whose peak to peak value represents the degree of deflection, strain, stress, or force applied. The indicator 32 either measures the peak to peak deflection, or rectifies the square wave output of the amplifer 30 to produce an indication of the values desired.

The indication may be some multiple of the peak to peak value measured by the amplifier 30. This depends upon the use to which the strain gauge is being put. For example, the strain gauge may be part of a weight scale for the purpose of measuring weights. In that case, a suitable multiple is applied to produce an output equal to pounds or kilograms.

Figure 4:
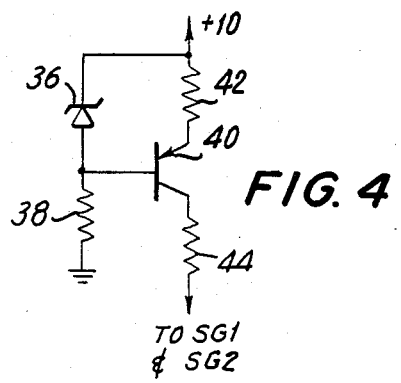
FIG. 4 is a circuit of a constant current source used in FIG. 3.

The constant current source 20 may be any type of known constant current source. One such example of a constant current source appears in FIG. 4. Here, a Zener diode 36, energized by the same 10 volt source as in FIG. 3 and through a grounded resistor 38 maintains a constant potential between the 10 volt source and the base of a PNP transistor 40 whose emitter receives current from source through a resistor 42. Current to the gauges SG1 and SG2 passes from the collector of the transistor 40 through a resistor 44. If the current through the transistor 40 tends to rise, voltage across the resistor 42 increases while the voltage at the base remains constant relative to the 10 volt source. Hence, the base emitter voltage decreases thereby decreasing the current flow through the collector. A tendency for the current to decrease causes a larger base emitter voltage and higher current through the collector.

Figure 5:
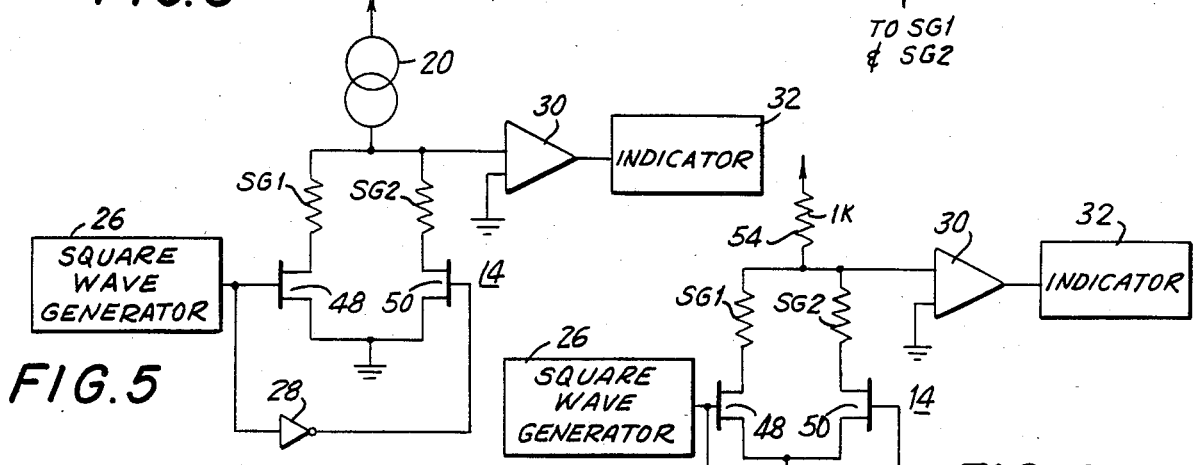
FIG. 5 is a circuit diagram of another embodiment of the gauge circuitry in FIGS. 1 and 2.

FIG. 5 illustrates another embodiment of the circuit 14 in FIGS. 1 and 2. Here, the transistors 22 and 24 of FIG. 3 are replaced by field effect transistors (FETs) 48 and 50. The circuit is otherwise the same as that in FIG. 3. The advantage of the field effect transistors 48 and 50 as compared with the reversed transistors 22 and 24 is that the voltage across source and drain, when the transistor is on, is 0.2 mV as compared to the 2 or 3 mV in the ordinary reversed transistors. This reduces the effective resistances in series with the gauges even further, perhaps to values of 0.1 ohms.

Figure 6:
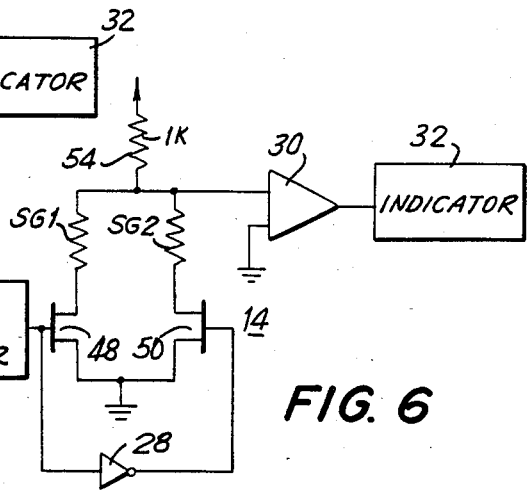
FIG. 6 is a circuit diagram of yet another circuit case in FIGS. 1 and 2 and embodying features of the invention.

FIG. 6 differs from FIG. 5 in that the constant current source 20 of FIG. 5 is replaced with an ordinary resistor 54. While a slight loss in accuracy may result from this arrangement, FIG. 6 is somewhat less expensive to build. In situations where the slight loss of accuracy is tolerable, customers may prefer the circuit of FIG. 6 to the more expensive circuits of FIGS. 3 and 5.

Figure 7:
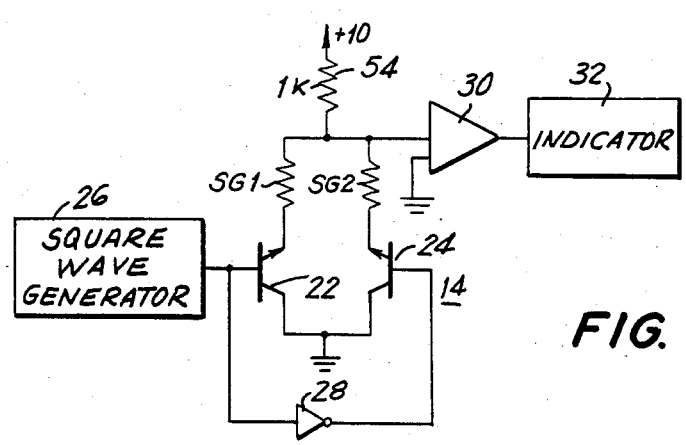
FIG. 7 is a circuit diagram of yet another embodiment of the circuitry in FIGS. 1 and 2.

An even less expensive circuit is shown in FIG. 7. This corresponds to the circuit in FIG. 6 except that the field effect transistors 48 and 50 of FIG. 6 have been replaced by the transistors 22 and 24 of FIG. 3. FIG. 7 compares to FIG. 3 in that the resistor 54 replaces the constant current source 20.

The operation of FIG. 5 is substantially identical to that of FIG. 3, except that greater accuracy can be expected as a result of the use of field effect transistors (FETs) 48 and 52. The operation of FIGS. 6 and 7 differ from those of FIGS. 3 and 5 in that the current through the gauges SG1 and SG2 is not constant. Rather, the current is determined by the resistances of the gauges SG1 and SG2 as compared to the resistance of the resistor 54. However, the result is almost the same. If, during conduction, the gauge SG1 exhibits a higher resistance, the output to the amplifier 30 goes up. However, the rise in output is not as large as that in FIGS. 3 and 5 because the higher current causes a rise in the voltage drop accross the resistor 54. In effect, half the signal arising across the gauge SG1 or the gauge SG2 is "swallowed" by the resistor 54.

As stated, the current source 20 or the resistor 54 and the square wave generator 26 with the inverter 28 drive currents alternately through the gauges SG1 and SG2 from a 10 volt source. If it is assumed that the voltage drop across a gauge such as SG1 and a transistor such as 22 or FET such as 48 is approximately 5 volts, and the voltage drop across the transistors 22 or 24 or FETs 48 and 50 are from 0.2 to 3 mV when these active elements are turned on, the total effect of the transister or FET voltage drops is $4 \times 10^{-5}$ to $6 \times 10^{-4}$ of the total output measured by the amplifier, or comparator 30. Therefore, if a temperature rise or drop changes the resistances of the gauges and the transistors 22, 24, 48, and 50 in different proportions, the effect of changes by the transistors 22 and 24 and FETs is minute by comparison to the gauges SG1 and SG2. Therefore, the resistances SG1 and SG2 are effectively being measured alternately relative to ground. Hence, a change in constant current source 20 or resistor 54, which are connected to both gauges SG1 and SG2, effect of the resistances of gauges SG1 and SG2 substantially equally or proportionately. As a result, the relationship between the resistances remains substantially unchanged. On the other hand, the square wave generator 26, the inverter 28, and the switching elements, i.e., transistors 22 and 24 or 48 and 50 cause alternate measurement of the currents through, and, hence resistances of, the gauges SG1 and SG2. This produces a square wave output whose amplitude represents the differences in currents or resistances. Any accuracies introduced by changes in temperature affect each of these current or impedance measurements throughout the range and merely create a small proportional change. Hence, an inaccuracy of one unit in a thousand will produce a result that is 99.9% correct. That is, a reading of 2 in a scale of 1000 would still be 99.9% correct.

On the other hand, in a direct current bridge, temperature variations which produce a shift of one unit in a thousand may shift the zero point one unit. Therefore a two-unit measurement may be off by as much as 50%.

The specification refers throughout to the resistances of the gauges. Of course, it is the overall impedances of the gauges, as well as of the resistors which is being considered. However, the resistances are the overwhelming component in each of the impedance values. This is also true of the emitter-collector resistances.

In view of the very low emitter-collector impedance and voltage drops of reversely poled transistors, and the extremely low source-drain resistances and voltage drops of FET's, matching of transistors or FET is unessential.

While the embodiments of the invention have been described in detail, it will be evident that the invention may be embodied otherwise without departing from its spirit and scope.

I claim:

1. A strain guage arrangement, comprising:
   a pair of strain gauges arranged mechanically for achieving opposite impedance effects in response to a strain;
   said gauges having predetermined impedances;
   driver means for driving current alternately through one of said gauges and then the other of said gauges;
   measuring means for measuring differences in the alternating currents through said gauges.

2. A device as in claim 1, wherein said driver means includes a pair of switches each in series with one of said gauges and having impedances more than two orders of magnitude lower than the impedances of said gauges.

3. A device as in claim 2, wherein said switches are transistors with emitters connected to oppose currents through the gauges.

4. A device as in claim 3, wherein said driver means includes a resistor, said resistor being connected in series with each of said gauges.

5. A device as in claim 3, wherein said driver means includes a constant current source, said constant current source being connected in series with each of said gauges.

6. A device as in claim 2, wherein said switches are field effect transistors.

7. A device as in claim 6, wherein said driver means includes a resistor, said resistor being connected in series with each of said gauges.

8. A device as in claim 6, wherein said driver means includes a constant current source, said constant current source being connected in series with each of said gauges.

9. A device as in claim 2, wherein said driver means includes a resistor, said resistor being connected in series with each of said gauges.

10. A device as in claim 2, wherein said driver means includes a constant current source, said constant current source being connected in series with each of said gauges.

11. A device as in claim 1, wherein said driver means includes a resistor, said resistor being connected in series with each of said gauges.

12. A device as in claim 1, wherein said driver means includes a constant current source, said constant current source being connected in series with each of said gauges.

13. For a pair of gauges arranged mechanically to achieve opposite impedance effects in response to a strain, a circuit for measuring the strain, comprising:
    driver means for driving current alternately through one of said gauges and then the other of said gauges, and
    measuring means for measuring the differences in alternating currents through said gauges.

14. A device as in claim 13, wherein said driver means includes a pair of switches each in series with one of said gauges and having impedance more than two orders of magnitude lower than the impedance of said gauges.

15. A device as in claim 14, wherein said switches are transistors with emitters connected to oppose currents through the gauges.

16. A device as in claim 15, wherein said driver means includes a resistor, said resistor being connected in series with each of said gauges.

17. A device in claim 15, wherein said driver means includes a constant current source, said constant current source being connected in series with each of said gauges.

18. A device as in claim 14, wherein said switches are field effect transistors.

19. A device as in claim 18, wherein said driver means includes a resistor, said resistor being connected in series with each of said gauges.

20. A device as in claim 18, wherein said driver means includes a constant current source, said constant current source being connected in series with each of said gauges.

21. A device as in claim 14, wherein said driver means includes a resistor, said resistor being connected in series with each of said gauges.

22. A device as in claim 14, wherein said driver means includes a constant current source, said constant current source being connected in series with each of said gauges.

23. A device as in claim 13, wherein said driver means includes a resistor, said resistor being connected in series with said gauges.

24. A device as in claim 13, wherein said driver means includes a constant current source, said constant current source being connected in series with each of said gauges.

* * * * *